United States Patent [19]

Miller

[11] 3,955,986

[45] May 11, 1976

[54] HARD SURFACE CLEANING AND POLISHING COMPOSITION

[75] Inventor: Richard K. Miller, Ramsey, N.J.

[73] Assignee: American Cyanamid Company, Stamford, Conn.

[22] Filed: Oct. 23, 1974

[21] Appl. No.: 517,264

Related U.S. Application Data

[63] Continuation-in-part of Ser. No. 377,680, July 9, 1973, abandoned.

[52] U.S. Cl. ................................................. 106/11
[51] Int. Cl.² ........................................... C09G 1/14
[58] Field of Search ..................... 106/11, 285, 10, 8

[56] References Cited
UNITED STATES PATENTS

| | | | |
|---|---|---|---|
| 1,121,590 | 12/1914 | Lewis | 106/285 |
| 2,884,329 | 4/1959 | Jezl | 106/10 |
| 2,946,746 | 7/1960 | Keller | 106/8 |
| 3,086,871 | 4/1963 | Sheldahl | 106/10 |
| 3,395,028 | 7/1968 | Mackles | 106/10 |
| 3,553,123 | 1/1971 | Behnke | 106/8 |

*Primary Examiner*—Theodore Morris
*Attorney, Agent, or Firm*—Charles J. Fickey

[57] ABSTRACT

A hard surface cleaning and polishing composition is provided comprising mineral oil, a nonionic surfactant, a paraffinic solvent, water, from 1 to 15 parts of a monoalkyl ether of ethylene glycol and from 1 to 10 parts of a monoalkyl ether of diethylene glycol said monoalkyls containing from 3 to 5 carbon atoms.

9 Claims, No Drawings

HARD SURFACE CLEANING AND POLISHING COMPOSITION

CROSS REFERENCE TO RELATED APPLICATIONS

This application constitutes a Continuation-in-part application of U.S. Pat. application Ser. No. 377,680, filed July 9, 1973 now abandoned.

Generally stated, the subject matter of the present invention relates to an improved hard surface cleaning composition. More particularly, the invention relates to a composition with cleaning and polishing properties for application on hard surfaces to be cleaned and to which a glossy appearance is to be imparted. The composition is particularly adaptable for application by aerosol spray methods.

BACKGROUND OF THE INVENTION

Various types of cleaning and polishing compositions have been suggested for use in cleaning and polishing hard surfaces. Those characteristics most desirable in such compositions include ease of application, such as by aerosol spray means; efficient cleaning and polishing effect with a minimum of rubbing or buffing; complete removal of various types of soil including both oil soluble and water soluble soils and easy removal of residue with no damage to the surface. The composition should generally result in a surface which has a uniform, clean, glossy appearance, soil shedding properties, as well as further resistance to staining or soiling.

Although various commercially available compositions exhibit some desirable properties and results with the wide variety of soil materials encountered and the various new type surfaces being produced, there is a need for an improved broad spectrum cleaning and polishing composition for such surfaces, which has the ability to remove any type of soil including both oil soluble and water soluble.

It is seldom necessary to remove only a single type of material or soil from soiled surface. Although certain of the cleaning compositions are effective against a particular type of soil, there is a need for a composition which is effective against any type of soil whether it is oil or water soluble, or acidic or basic in nature. Difficulties have been encountered in achieving such a broad spectrum cleaning composition since the various necessary components are oftentime incompatible with each other.

The present invention represents the culmination of a long series of investigations conducted largely by the inventor directed to providing a broad spectrum cleaning and polishing composition for hard surfaces.

Accordingly, it is the primary object of the present invention to provide a broad spectrum cleaning agent for hard surfaces.

Another object of the invention is to provide a broad spectrum cleaning and polishing agent for hard surfaces.

Generally then, it is an object of this invention to provide a broad spectrum cleaning and polishing composition for hard surfaces which is not damaging to the surface, can be easily applied and removed with a minimum of rubbing or buffing, serves to remove a wide variety of soil material leaving a surface having a uniform, clean, glossy appearance, and also provides soil shedding properties, as well as further resistance to staining and soiling.

Additional objects and advantages of the invention will be set forth in part in the description which follows and in part will be obvious from the description, or may be realized by practice of the invention, the objects and advantages being realized and attained by means of the methods, processes, instrumentalities and combinations particularly pointed out in the appended claims.

THE INVENTION

To achieve the foregoing objects and in accordance with its purpose as embodied and broadly described, the present invention relates to a cleaning and polishing composition comprising mineral oil, a nonionic surfactant, a paraffinic solvent, water, from 1 to 15 parts of a monoalkyl ether of ethylene glycol and from 1 to 10 parts of a monoalkyl ether of diethylene glycol said monoalkyls containing from 3 to 5 carbon atoms.

It is to be understood that both the foregoing general description and the following detailed description are exemplary and explanatory and are not restrictive of the invention.

The present invention resides in the discovery of a composition which is effective for the cleaning and polishing of various types of hard surfaces which have been soiled with a wide variety of soil materials that are both oil and water soluble.

The new composition is effective against a large variety of soils or staining materials; including both oil soluble and water soluble stains and soils. Such soiling materials include coffee, tea, crayon marks, ball point ink, shoe polish, pencil marks and lipstick among others, and food stains such as, catsup, jelly, milk, fruit juice, mustard and the like. The above stains or soil materials are representative and should not be construed as embracing all the stain and soiling materials against which the new composition is effective.

The new composition is generally effective on any type of hard surfaces where a clean, glossy finish is desired. These include plastic laminate countertop surfaces; including matte finishes, glossy finishes and slightly rough finishes, sometimes referred to as a suede finish, baked enamel surfaces, stainless steel surfaces, porcelain, glossy painted surfaces, ceramic tile surfaces, and the like. These surfaces may be encountered throughout the household, for example, on kitchen countertops, appliances and bathroom surfaces among others. Thus, the composition may be used wherever a clean, glossy surface is desired.

The composition of the present invention has superior properties. For example, ease of application with no damage to the surface if allowed to stand on the surface before cleaning and polishing, good leveling properties; resulting in clean, glossy surfaces obtained with a minimum of mechanical effort. In addition, there results no residual film to cause streaking, nor does any film remain which attracts dirt and must be removed by excessive and vigorous buffing. A particular characteristic of the composition is its ability to remove practically any type of soil encountered which is generally not the case with commercially available compositions.

The composition of the invention comprises a surface active cleaning and dispersing agent, one or more organic solvents, water and particular concentrations of a monoalkyl ether of ethylene glycol and a monoalkyl ether of diethylene glycol. In those instances where the application of the composition is to be made from a pressure type aerosol device, a conventional type of propellant is employed.

In addition, other less essential materials may be present such as a dye for coloring purposes, a perfume or scented material, corrosion inhibitors, antioxidants and the like.

The compositions with respect to components and the concentrations thereof may be represented as follows:

| | Parts |
|---|---|
| Monoalkyl ($C_3$–$C_5$) ether of ethylene glycol | 1 to 15 |
| Monoalkyl ($C_3$–$C_5$) ether of diethylene glycol | 1 to 10 |
| Nonionic surfactant | 0.5 to 4 |
| Mineral oil | 10 to 40 |
| Paraffinic solvent | 5 to 10 |
| Water | 20 to 70 |
| And where desired - aerosol propellant | 15 to 40 |

Preferred compositions may be expressed as:

| | Parts |
|---|---|
| Butylether of ethylene glycol | 1 to 15 |
| Butylether of diethylene glycol | 1 to 10 |
| Sorbitol monooleate | 0.5 to 4 |
| Mineral Oil | 10 to 40 |
| Paraffinic solvent | 5 to 40 |
| Water | 20 to 70 |
| Isobutane | 7.5 to 25 |
| Dichlorodifluoromethane | 7.5 to 25 |

The composition exists in the form of a two phase system which is both easily and completely emulsified. For example, two or three shakes of the container prior to applying the composition to the surface to be cleaned is usually sufficient. The resulting emulsion is of such a nature that it almost immediately separates into a two phase system.

The mechanism of action of the composition is not completely understood, but it is believed that the two phase system is one of the effective features of the composition which serves to provide superior cleaning results. The composition of the invention is unique in that the various components, to result in a superior cleaning composition, are compatible with each other as a two phase system which is easily emulsified and then also easily breaks. In other words, to achieve the superior composition the components must co-act in such a way that effective cleaning results regardless of the type of soil encountered. A critical feature of the present invention is the utilization of the combination of lower alkyl ethers of ethylene glycol and diethylene glycol in the particular concentrations recited.

While each of the components of the composition has at some time or another been employed in a cleaning composition to achieve a particular result, the composition as herein described achieves removal effects which heretofore could not be obtained. Compared with other commercially available cleaners, the results are striking in that practically any type of soil encountered is effectively removed from the surface with a minimum effort; leaving the surface in a clean, non-streaked condition with no residual dirt collecting film.

The nonionic surfactant employed in the present invention is defined as a water soluble surface active agent which does not ionize in solution. Illustrative of such surfactants are fatty alkanolamides, ethylene oxide derivatives and sugar esters. The ethylene oxide derivatives are preferred; particularly the long chain fatty sorbitol types, such as sorbitol monooleate.

In some instances it may be desirable to extend the transitional emulsion phase of the composition so as to avoid the necessity of repeated agitation of the composition to achieve emulsification. It has been found that this may best be achieved by replacing a portion of the nonionic surfactant with a fatty acid soap such as an alkaline earth metal salt of a fatty acid. A preferred composition would contain equal portions of the nonionic surfactant and the fatty acid soap. The concentration of nonionic surfactant to fatty acid soap can vary in the range of 1:1 to 1:4. Illustrative of the alkaline earth metal salts of a fatty acid are the sodium and potassium salts of long chain fatty acids, preferably the tall oil fatty acids such as oleic, myristic and stearic acid, among others.

As employed in the instant specification and claims, the term paraffinic solvent shall be defined as a nonpolar, hydrocarbon solvent comprising saturated aliphatic hydrocarbons, which has a boiling point of 240°F, a specific gravity of 0.722 at 60°F and a viscosity of 0.86 cs at 25°C. The solvent is commercially available from Exxon Chemical under the trademark Isopar E.

The composition may be employed in a normal type container or more conveniently, the composition is adaptable for application from a pressure aerosol spray can. Conventional propellants can be used, such as various types of halogenated methane and ethane hydrocarbons, or in addition, saturated aliphatic hydrocarbons of up to four carbon atoms may be used as such or in combination. Thus examples of hydrocarbon materials include methane, isopropane, butane, isobutane, and the like. Examples of the halogenated hydrocarbon propellants include dichlorodifluoromethane, trichloromonofluoromethane, 1,2-difluoroethane and the like. In addition, the propellant can also constitute a mixture of a saturated aliphatic hydrocarbon and a halogenated hydrocarbon, such as isobutane and dichlorodifluoromethane.

The following examples are provided for illustrative purposes and may include particular features of the invention. However, the examples should not be construed as limiting the invention, many variations of which are possible without departing from the spirit or scope thereof.

EXAMPLE I

Preparation of Cleaning Composition and Comparison With Commercial Products

A cleaner-polish composition was prepared by mixing approximate amounts of the following components and charging them in an aerosol pressure container:

| | Parts |
|---|---|
| Ethylene Glycol Monobutyl ether | 4 |
| Diethylene Glycol Monobutyl ether | 2 |
| Sorbitol Monooleate | 2 |
| Paraffinic Solvent (Isopar E) | 20 |
| Mineral Oil | 20 |
| Water | 33 |
| Isobutane | 10 |
| Dichlorodifluoromethane | 10 |

EXAMPLE II

The cleaning composition of Example I was compared with other popular commercially marketed cleaner products. For this purpose a panel of smooth surface, laminated plastic, countertop material was soiled with a variety of soils across the length of the panel using both oil soluble type and water soluble type of soiling materials; after application of the soils the panel was aged, thus allowing the soil material to dry.

Soiling materials included shoe polish, lipstick, ball point pen ink, crayon, coffee, tea, and milk stain, mustard, catsup, steak sauce, fruit juice, food grease, etc. The soiling material could be described as falling generally into two classes, that is water soluble soils or stains and oil soluble soils or stains.

The panel was then divided into five areas. To each area was then applied a cleaning composition, the other areas being covered allowing only the particular area to which the cleaner is applied being exposed. Using a conventional type cleaning cloth pad, a rubbing or buffing action was then applied to the panel under test, and an observation was made as to the type of soil which was removed and the approximate degree of removal; in applying the cleaner pad, a stroke action was used, approximately 10 to 15 strokes being used in each instance. With regard to the commercial cleaners, the label directions were followed. The results are shown in the following table:

Table 1

| Cleaning Composition | Result & Type of Soiling Attacked |
| --- | --- |
| Competitive Commercial Product 1 (Previous Water Washing) | Water soluble soils - almost all soil removed: Oil soluble soils - some soil removed: Ink - some soil removed |
| Competitive Commercial Product 1 (No prior cleaning) | Water soluble soils - no soil removed: Oil soluble soils - some soil removed: Ink - no soil removed |
| Competitive Commercial Product 2 | Water soluble soils - all soils removed: Oil soluble soils - some soil removed Ink - almost all soils removed. |
| Competitive Commercial Product 3 | Water soluble soils - all soils removed: Oil soluble soils - some soils removed: Ink - some soils removed |
| Composition of the present invention | Water soluble soils - all soils removed: Oil soluble soils - almost all soils removed: Ink - almost all soil removed, superior in results to the (3) three above competitive products |

EXAMPLE III

A rough or suede finish laminated plastic countertop panel was soiled in a fashion similar to that described in Example I and to portions of the panel in a similar fashion were applied 3 popular, competitive, commercially available cleaning compositions and the composition of the invention prepared as described in Example I. Similar observations were made as to effectiveness of the applications. A second application of the cleaner was then made and the results observed. The results are shown as follows:

Table 2

Competitive Product 1

First Application

Some improvement in water based soil material, but very little improvement in the oil based soil materials; including crayon, shoe polish, and ball point pen ink.

Second Application

Some general improvement throughout.

Competitive Product 2

First Application

Some improvement on oil based soils, but less improvement on water based soils.

Second Application

Slight additional improvement overall, but water based soil such as mustard not affected.

Competitive Product 3

First & Second Applications

Results similar to that of Competitive Product 1 in each instance.

Composition of the Present Invention

First Application

Some improvement in attacking all types of soil material.

Second Application

Generally improved results superior to other products.

I claim:

1. In a hard surface cleaning and polishing composition consisting essentially of mineral oil, a nonionic surfactant and a paraffinic solvent, the improvement consisting essentially of the addition of 1 to 15 parts of a monoalkyl ether of ethyl glycol and 1 to 10 parts of a monoalkyl ether of diethylene glycol, said monoalkyls having from 3 to 5 carbon atoms.

2. A composition of matter comprising the composition of claim 1 and 15 to 40 parts of an aerosol propellant.

3. The composition according to claim 2 wherein the aerosol porpellant is dichlorodifluoromethane.

4. The composition according to claim 2 wherein the aerosol propellant consists of a mixture of isobutane and dichlorodifluoromethane.

5. The composition according to claim 1 wherein the monoalkyl ether of ethylene glycol is ethylene glycol monobutyl ether.

6. The composition according to claim 1 wherein the monoalkyl ether of diethylene glycol is diethylene glycol monobutyl ether.

7. The composition according to claim 1 wherein the nonionic surfactant is sorbitol monooleate.

8. The composition according to claim 1 wherein a portion of the nonionic surfactant is replaced with an alkaline earth metal salt of a fatty acid.

9. The composition according to claim 8 in which the ratio of nonionic surfactant to alkaline earth metal salt of a fatty acid is in the range of 1:1 to 1:4.

* * * * *